(12) United States Patent
Egilsson et al.

(10) Patent No.: US 6,356,900 B1
(45) Date of Patent: Mar. 12, 2002

(54) ONLINE MODIFICATIONS OF RELATIONS IN MULTIDIMENSIONAL PROCESSING

(75) Inventors: Agust Sverrir Egilsson, Madison, WI (US); Hakon Gudbjartsson, Reykjavik (IS)

(73) Assignee: deCODE Genetics ehf, Reykjavik (IS)

( * ) Notice: Subject to any disclaimer, the term of this patent is extended or adjusted under 35 U.S.C. 154(b) by 0 days.

(21) Appl. No.: 09/475,786

(22) Filed: Dec. 30, 1999

(51) Int. Cl.$^7$ ............................................... G06F 17/30
(52) U.S. Cl. .............................. 707/5; 707/2; 707/102; 707/103; 707/902; 709/238; 712/11; 712/12; 712/16
(58) Field of Search ............................... 707/1, 2, 3, 4, 707/5, 100, 101, 102, 103

(56) References Cited

U.S. PATENT DOCUMENTS

| | | | |
|---|---|---|---|
| 5,257,365 A | * 10/1993 | Powers et al. ............... | 395/600 |
| 5,664,172 A | * 9/1997 | Antoshenkov ............... | 395/604 |
| 5,799,300 A | 8/1998 | Agrawal et al. ............... | 707/5 |
| 5,822,751 A | 10/1998 | Gray et al. ..................... | 707/3 |
| 5,832,475 A | 11/1998 | Agrawal et al. ............... | 707/2 |
| 5,890,151 A | 3/1999 | Agrawal et al. ............... | 707/5 |
| 5,905,985 A | 5/1999 | Malloy et al. ............... | 707/100 |
| 5,926,818 A | 7/1999 | Malloy ........................ | 707/100 |
| 5,926,820 A | 7/1999 | Agrawal et al. ............ | 707/200 |
| 6,115,714 A | * 9/2000 | Gallagher et al. .......... | 707/100 |

OTHER PUBLICATIONS

Codd, E.F., "A Relational Model of Data for Large Shared Data Banks," *Communications of the ACM*, 13 (6) :377–387 (1970).

Agrawal, R. et al., "Modeling Multidimensional Databases," Research Report, IBM Almaden Research Center.

Codd, E.F. et al., "Providing OLAP to User–Analysts: An IT Mandate," E.F. Codd Associates (1993).

Ramakrishnan, R. et al., Database Management Systems, McGraw–Hill (1998).

Singh, H.S., Data Warehousing: Concepts, Technologies, Implementations, and Management, Prentice Hall PTR (1998).

* cited by examiner

*Primary Examiner*—Thomas Black
*Assistant Examiner*—Jacques Veillard
(74) *Attorney, Agent, or Firm*—Hamilton, Brook, Smith, Reynolds, P.C.

(57) ABSTRACT

A method/operator is disclosed that adjusts measurements during processing in a multidimensional data cube. The online "depth-of-field" operator disclosed varies the density of points in a representation of the multidimensional cube. The operator may be applied to any collection of dimensions and relations supported by the dimensions, using hierarchical structures to control the adjustments. It allows one to experiment online with the definition of relations during multidimensional possessing, thereby controlling the output of the synthesizing process. The operator may be used to equate attributes based on their hierarchical positions when processing measurements in a hypercube. Furthermore, it may be used to reveal hidden dependencies between variables when working with measurements with varying levels of granularity. As is the case when processing health related data for individuals or when processing heterogeneous relations from different sources such as a combination of measurements about individuals, their ancestors and the environment. The methods disclosed are generic and applicable to any data warehouse design and enable OLAP for a wider variety of data and structures than current implementation schemas.

8 Claims, 12 Drawing Sheets

HIERARCHICAL STRUCTURES AND LEVEL SETS 400

CONVERTING HIERARCHIES TO DIMENSION TABLES ← 1000

1003

| | |
|---|---|
| 1 | 5 |
| 2 | 6 |
| 3 | 7 |
| 4 | 7 |
| 5 | 7 |
| 6 | 7 |

1002 →

ENABLING TRANSLATION
TO DIMENSION TABLES
BY ADDING LOWER
LEVEL ELEMENTS INTO
THE HIERARCHY AS
DETERMINED BY THE
GROUPING OPERATORS

1001

| | |
|---|---|
| 1 | 5 |
| 2 | 6 |
| 3' | 3 |
| 4' | 4 |
| 5' | 5 |
| 6' | 6 |
| 7" | 7' |
| 3 | 7 |
| 4 | 7 |
| 5 | 7 |
| 6 | 7 |
| 7' | 7 |

FIG. 10

HYPERCUBES FROM HIERARCHIES, MEASUREMENTS AND AXES MATRICES — 1200

D: DEPTH-OF FIELD
B: BLOWUP ANALYSIS
G: GROUPING OPERATOR
$L_i$: LEVEL SET i
$(L_i)$: $L_i$ IS NOT AN AGGREGATED LEVEL

ONLINE MODIFICATIONS OF RELATIONS IN MULTIDIMENSIONAL PROCESSING

RELATED APPLICATIONS

Filed on even date with this application are two U.S. patent applications of related subject matter. One is entitled "Online Modifications of Dimension Structures in Multidimensional Processing"Ser. No. 09/475,695. The other is entitled "Online Syntheses Programming Technique"Ser. No. 09/475,436. The entire teachings of the foregoing applications are incorporated herein by reference.

BACKGROUND OF THE INVENTION

1. Field of the Invention

This invention relates in general to data management systems performed by computers, and in particular, to the processing of heterogeneous relations in systems that support multidimensional data processing.

2. Description of Related Art

Multidimensional data processing or the OLAP category of software tools is used to identify tools that provide users with multidimensional conceptual view of data, operations on dimensions, aggregation, intuitive data manipulation and reporting. The term OLAP (Online analytic processing) was coined by Codd et al in 1993 (see Codd, E. F. et al., "Providing OLAP to User-Analysts: An IT Mandate", E.F. Codd Associates, 1993). The paper by Codd et al also defines the OLAP category further. An overview of OLAP and other data warehousing technologies and terms is contained in Singh, H. S., "Data Warehousing. Concepts, Technologies, Implementations, and Management," Prentice Hall PTR, 1998. The text by Ramakrishnan et al. in Ramakrishnan, R. and Gehrke, J., "Database Management Systems", second edition, McGraw-Hill, 1999, describes basic multidimensional—and relational database techniques, many of which are referred to herein.

OLAP systems are sometimes implemented by moving data into specialized databases, which are optimized for providing OLAP functionality. In many cases, the receiving data storage is multidimensional in design. Another approach is to directly query data in relational databases in order to facilitate OLAP. U.S. Pat. No. 5,926,818 by Malloy and U.S. Pat. No. 5,905,985 by Malloy et al describe techniques for combining the two approaches. The relational model is described in Codd, E. F., "A Relational Model of Data for Large Shared Data Banks, *Communications of the ACM* 13(6):377–387 (1970).

OLAP systems are used to define multidimensional cubes, each with several dimensions, i.e., hypercubes, and should support operations on the hypercubes. The operations include for example: slicing, grouping of values, drill-down, roll-up and the viewing of different hyperplanes or even projections in the cube. The research report by Agrawal et al (Agrawal et al., "Modeling Multidimensional Databases," Research Report, IBM Almaden Research Center) describes algebraic operations useful in a hypercube based data model for multidimensional databases. Aggregate-type operations are described in several U.S. patents by Agrawal et al. and Gray et al. (i.e., U.S. Pat. Nos. 5,832,475; 5,890,151; 5,799,300; 5,926,820 by Agrawal et al. and U.S. Pat. No. 5,822,751 by Gray et al.

SUMMARY OF THE INVENTION

Measurements from various institutions and research entities are by nature heterogeneous. Synthesizing measurements into longer strings of information is a complex process requiring nonstandard operations. This is especially true when dealing with measurements lacking the accountant type structure of business related data. As, for example, health related information about individuals, genotype readings, genealogy records and environmental readings. The shortcomings of current OLAP tools in dealing with these types of non-associative measurements is evident, for example, by realizing the emphasis placed on aggregation operators such as max, min, average and sum in current tools and research. Most often, these operators are rendered useless by the lack of a quantifying domain such as "money". On the other hand, when carefully synthesized and analyzed, these and other similar sets of measurements do contain valuable knowledge that may be brought to light using multidimensional analysis.

In order to overcome some of the limitation in the prior art, the present invention discloses methods and embodiments supporting multidimensional analysis in data management systems.

An object of the present invention is to enable online tuning of relations in multidimensional analysis. According to the invention, relations are modified by a depth-of-field operator that can be applied to any collection of dimensions and relations supported by the dimensions. In effect, the online depth-of-field operator varies the density of points or facts in a representation of a multidimensional cube. It allows one to experiment online with the definition of relations, thereby controlling the output of the synthesizing process.

It is also an object of the present invention to facilitate online definitions of multidimensional cubes fit for being populated with data from various measurements and other cubes. According to the invention an axes matrix is used to specify axes structures related to each dimension or domain. An operator, called blowup operator herein, possibly associated with the axes matrix is implemented. These techniques create a connection between measurements and domains, and a user defined multidimensional view containing knowledge that is acquired through complex multidimensional processing.

It is another object of the present invention to implement a syntheses process for multidimensional analysis. The process dynamically eliminates ambiguities, observed in combined measurements used to populate a hypercube. This is achieved by introducing additional relations reflecting dependencies between dimensions in the hypercube and by confirming combined measurements against selected realistic observations.

It is yet another object of the present invention to implement a system that enables OLAP for a wider variety of data and structures than current relational implementation schemas, such as the star or snowflake schema and related techniques. In some cases, this is done by forcing the structures into current schemas, but in other cases, new and more dynamic schemas are introduced. Among the structures is a grouping operator for multidimensional analysis, applicable, among other things, to measurements about domains with variable level of granularity. The operator does not force the measurements into using the same level of granularity or hierarchy and it is generic with respect to any domain and hierarchical structure.

The main processes introduced are reversible and therefore may be made to be well-behaved with respect to adding, updating or deleting measurements from the original system of relations. Thus, the processes, when combined, define a continuously updateable/editable OLAP system for heterogeneous relations. The heterogeneous relations and dimension structures may include, but are by no way limited to, measurements relating to health data for individuals (e.g., biomarkers), ecological data, genotype readings (e.g., location of markers in individuals), genealogical records, geographical data and so on.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 10 is an illustration of a process used to convert hierarchies to dimension tables according to the present invention.

DETAILED DESCRIPTION OF THE INVENTION

The following description of the preferred embodiment is to be understood as only one of many possible embodiments allowed by the scope of the present invention. Reference is made to the accompanying figures, which form a part hereof.
Overview Data from multiple sources has to be preprocessed before being fit for multidimensional analysis in a hypercube. This preprocessing is time-consuming, and to a great extend performed manually by ad-hoc programming or by the use of various tools designed specifically for each increment of the data warehousing process. More importantly, this preprocessing may need to be repeated every time a new knowledge is sought to be extracted from the data. The work may include adjusting the level of granularity of the data so that smaller strings of data, i.e., measurements, can be synthesized into larger pieces of information. The data strings have to be mapped onto dimensions and the mapping and the dimension structures depend on what type of knowledge is being sought from the data. To complicate things further, the dimensions are not necessarily independent variables and that leads to ambiguity, which needs to be resolved.

Current techniques tend to be optimized to handle simple data, such as sales information by location, time, buyer, product and price. For this type of data, the level of granularity can be set universally, ambiguity is minimal and hierarchies are regular. In addition, for this type of data, the most useful aggregation operators are average, summation, maximums and minimum calculations. On the other hand, more complex data may require set operations like kinship measures and other non-binary or non-associative operators.

The current invention reveals processes that transform a set of heterogeneous measurements, i.e., relations, into multidimensional data cubes, i.e., hypercubes. The original heterogeneous measurements are used to populate the cubes directly. The cubes support complex dimension structures, ambiguity resolution, complex operations between level sets and hierarchies that are not necessary regular or of aggregation type. Furthermore, the methods are entirely generic and therefore applicable to any data warehouse design. When combined and stored as definitions in additional metadata structures, e.g., the axes matrices of the present invention, the methods facilitate the automation of the processes required to build a data warehouse.

Hardware

Figure 1:
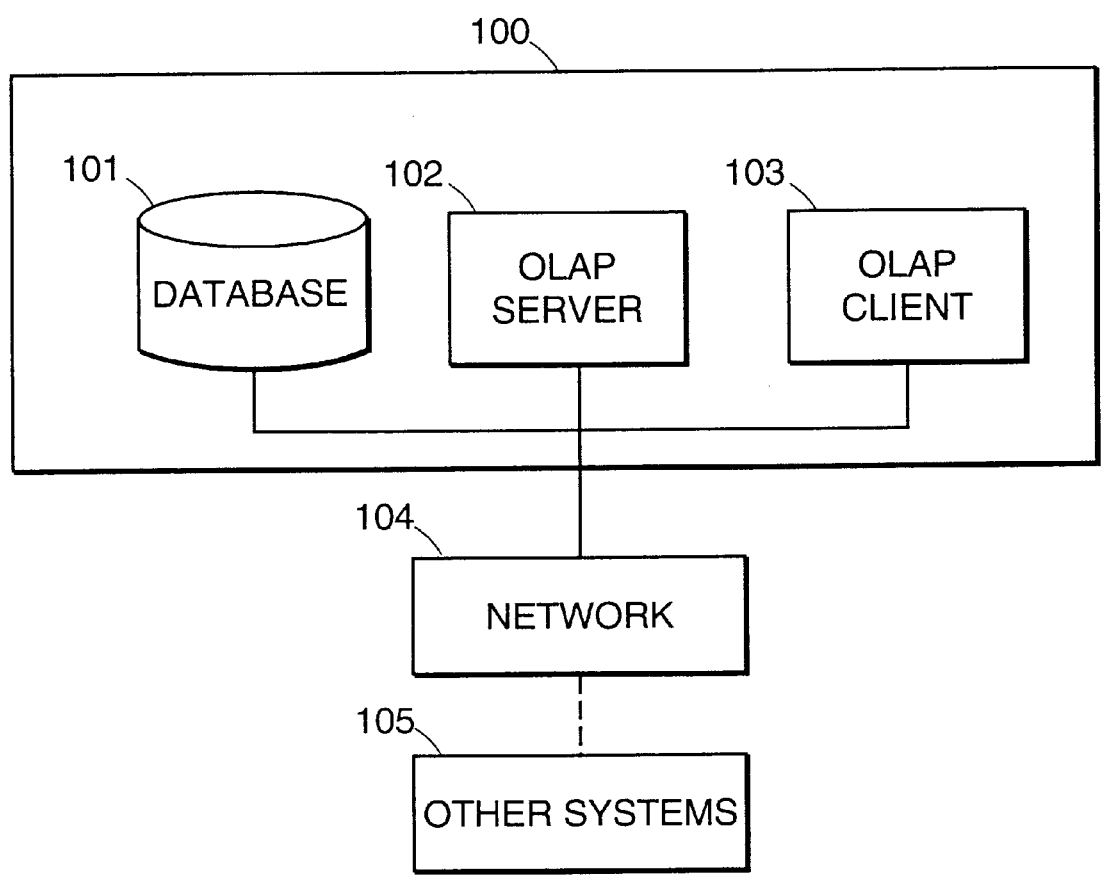
FIG. 1 is a block diagram illustrating an exemplary hardware setup required to implement the preferred embodiment of the present invention.

FIG. 1 is a block diagram illustrating an exemplary hardware setup required to implement the preferred embodiment of the present invention. A client/server architecture is illustrated comprising a database server 101 and an OLAP server 102 coupled to an OLAP client 103. In the exemplary hardware setup shown, the database server 101, the OLAP server 102 and the OLAP client 103 may each include, inter alia, a processor, memory, keyboard, pointing device, display and a data storage device. The computers may be networked together through a networking architecture 104 that may be a local network connecting the hardware 101, 102 and 103. The network may also connect to other systems 105. The OLAP client 103, the database server 101 and the OLAP server 102 may all or some be located on remote networks connected together by a complex network architecture 104 that may include utilizing many different networking protocols.

Those skilled in the art will also recognize that the present invention may be implemented combining some of the systems on a single computer, rather than the multiple computers networked together as shown. Those skilled in the art will further recognize that the present invention may be implemented using hardware where the database server 101 and/or the OLAP server 102 are distributed over several computers networked together. In the exemplary illustration the database 101, the OLAP server 102, and the OLAP client (or clients) 103 are grouped together as being the primary systems 100 for performing multidimensional analysis according to the present invention. Other systems (105), may however feed the combined system 100 with new data and information, through the network 104, that subsequently may become part of the multidimensional analysis.

Typically, the present invention is implemented using one or more computers that operate under control from operating systems such as Windows or UNIX type systems, etc. The operating systems enable the computers to perform the required functions as described herein. The database server 101 may support complex relational or multidimensional database designs or both but also a simpler system of flat files will suffice. The methods described in the present invention may be stored in the form of executable program code, in various formats. The program/machine code may be stored in the different systems shown in 100 both in memory and on storage devices. This may include low-level machine-readable code, high-level SQL statements, code executable in the database system and other program code executable within the various systems or subsystems in 100. The code may be generated using various programming environments, including many C++ packages and the various languages specifically designed for accessing databases. The present invention may thus be considered a software article, which may be distributed and accessed using the various media or communication devices compatible with the operating systems used.

Multidimensional Analysis

Figure 2:
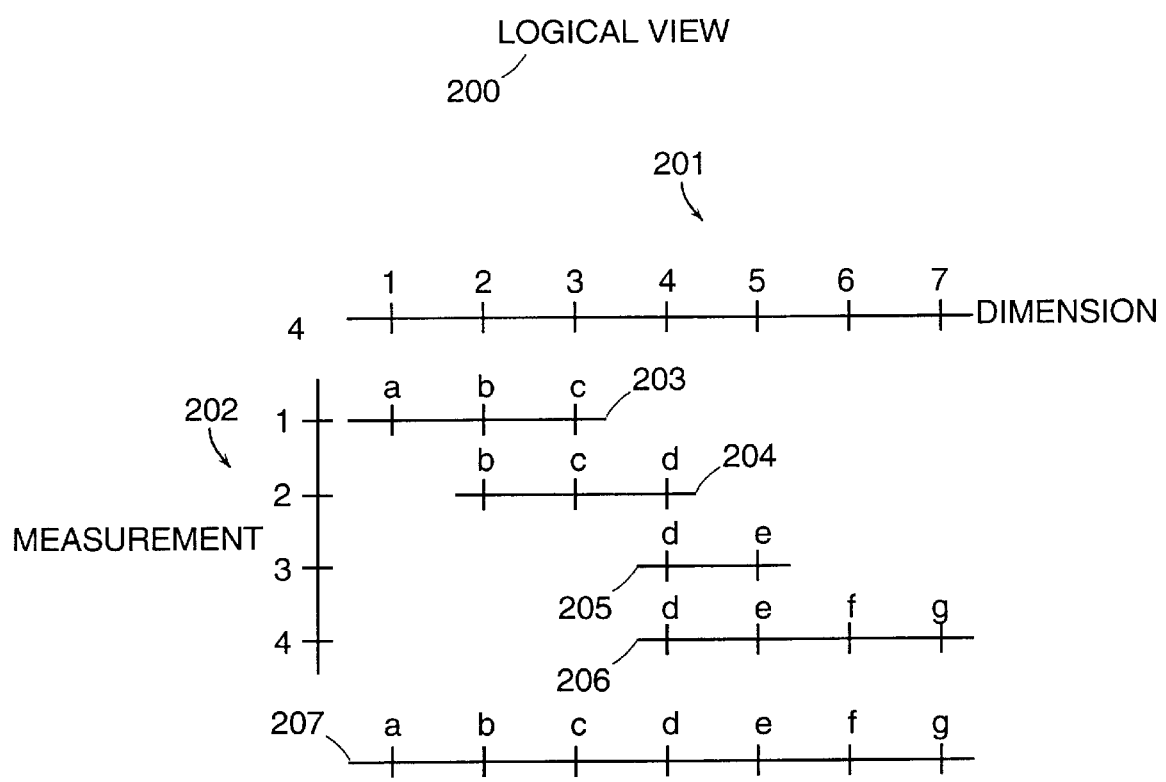
FIG. 2 is a high level illustration of a join process associated with multidimensional analysis.

FIG. 2 is a high level illustration of a join process associated with multidimensional analysis. It introduces the logical or conceptual view (200) of measurements, dimensions and compositions of measurements that is used throughout the present specification. The illustration is achieved by exemplifying the concepts. FIG. 2 shows four measurements numbered (202) by 1, 2, 3 and 4 and identified respectively as 203, 204, 205 and 206. A measurement is a collection of related attributes/values from a stored or derived relation. Measurement 203 is from a relation on dimensions numbered by 1, 2 and 3 in the sequence of dimensions 201, it is therefore an element from a ternary relation with its first element (sometimes called attribute) "a" from dimension 1, second element "b" from dimensions 2 and third element "c" from dimension number 3. The measurement is said, here, to be about any of the dimensions or domains that support the measurement, e.g., 203 is a measurement about dimension (or domain) 1, 2 or 3 and it is supported by the collection of dimensions (or domains) 1 2 and 3. The measurement may be stored as a row in a relational database system (101), i.e., in a table with three columns, each representing one of the domains 1, 2 and 3, as is well known in the prior art. It may also be stored as a sequence of, possibly indirect, references to the attributes "a", "b" and "c" in other structures either in a relational or multidimensional database or in files in 101. It may also only exist in memory (100), even temporarily, or be the result of calculations or other processes that define relations, including derived relations obtained by copying or manipulating existing relations. Similar descriptions apply to the other measurements 204, 205 and 206. Measurement 204 is from a ternary relation on dimensions 2, 3 and 4 as shown, measurement 205 is from a binary relation on dimensions 4 and 5, etc.

The measurements 203, 204, 205 and 206, as shown, are selected such that they agree on overlapping dimensions and can therefore be joined, using the natural join, to form a larger composed measurement 207. The composed measurement 207 is referred to, here, as a point in a multidimensional cube, i.e., a hypercube, with dimensions numbered by the sequence 201. This default criterion, i.e., that the values agree and that the natural join is used, may be replaced for specific dimensions with other criteria. Thereby, allowing measurements to be composed or joined differently using operators (called join operators here) that specify the corresponding dimension values for the composed measurements. The default (natural) join process shown above and demonstrated on FIG. 2, uses a join criterion requiring matching values, for the same dimensions, and the join operator simply copies the values from the original measurements to the composed measurement. Well known operators such as sum, max, min or even averaging and many others may also be used as join operators. This may require that dimensions have a variant number of values associated with it, i.e., that the active domain changes online. As an example illustrating this a join criterion for a dimension containing values from a "money" domain may be to require that the attributes from different measurements about the dimension are numeric. The summation operator may then be used in the join process to assign an attribute from the "money" dimension to the composed measurement. Which join criterion and join operator is associated with each dimension may be controlled and defined by the user of the system performing the analysis. It may also be determined by the system using default behavior associated with domains or determined by available metadata.

In order to define consistent results, independent of the order of compositions, for a sequence of joins performed using a join criterion; the join criterion may be required to define a mathematical equivalence binary (self-) relation on the dimension. In other words, be reflexive, symmetrical, and transitive. A binary relation over the dimension may be stored in system 100, for example, as a table with two columns, each containing values from the dimension. Checking and enforcing any of the three conditions when storing or using a relation over the dimension can be implemented by simple algorithms and methods. Reflexivity may be enforced for a binary relation by checking for equality of the attributes forming a pair when evaluating if the pair is in the binary relation required to be reflexive. Symmetry may be enforced for a binary relation by only requiring a pair or its reflection to be actually stored in the table in order to be considered a part of the symmetrical relation. Transitivity may be enforced by similar methods: E.g., when a row is added, representing a new pair in the binary relation, to the table holding the binary relation, the system may also add, recursively, all other pairs (rows) needed to maintain transitivity. Equivalence binary relations may be defined by the user of the system or be predefined and may be stored along with other definitions in system 100 as described above.

As relations are selected for multidimensional processing in a hypercube, each of the domains supporting the relations is associated with a dimension in the hypercube. Relations containing measurements about a common domain may be made to share the same dimension in the hypercube or the domain may be mapped to different dimensions in the hypercube for some of the relations. This mapping of domains to dimensions, and the naming of dimensions, is controlled by the user of the system performing the multidimensional processing or OLAP. The mapping may also be controlled fully or partly by the system using available metadata and default system behavior to determine the mapping and naming of dimensions. An example described in connection with FIG. 7 below illustrates this by mapping an "Age" domain in two relations, called Diagnosis and Whereabouts, to two different dimensions, called "Age-Diagnosis" and "Age-Location", in a hypercube.

A set of points in a hypercube along with operators and additional structures in the cube is what enables multidimensional analysis or OLAP. The operators and structures may include, inter alia, hierarchies, measures, aggregation or grouping operators, projections, slice and dice, drill-down or roll-up. Commonly used implementation techniques include star and snowflake schema databases as OLAP servers. A hypercube may consist of selected dimensions, their associated join criteria and join operators, together with additional selected structures, such as hierarchies and level sets, and also the various relations used to generate points, i.e., populate, the hypercube. A hypercube may be represented in different forms revealing all or some of its structure. Examples of hypercube models include the star and snowflake schemas, mentioned above, and used in connection with relational OLAP. Many other representations exist such as the ones found in multidimensional databases, e.g., Oracle Express from Oracle Inc or Hyperion Essbase from Hyperion Solutions.

Domains and Dimensions

Figure 3:
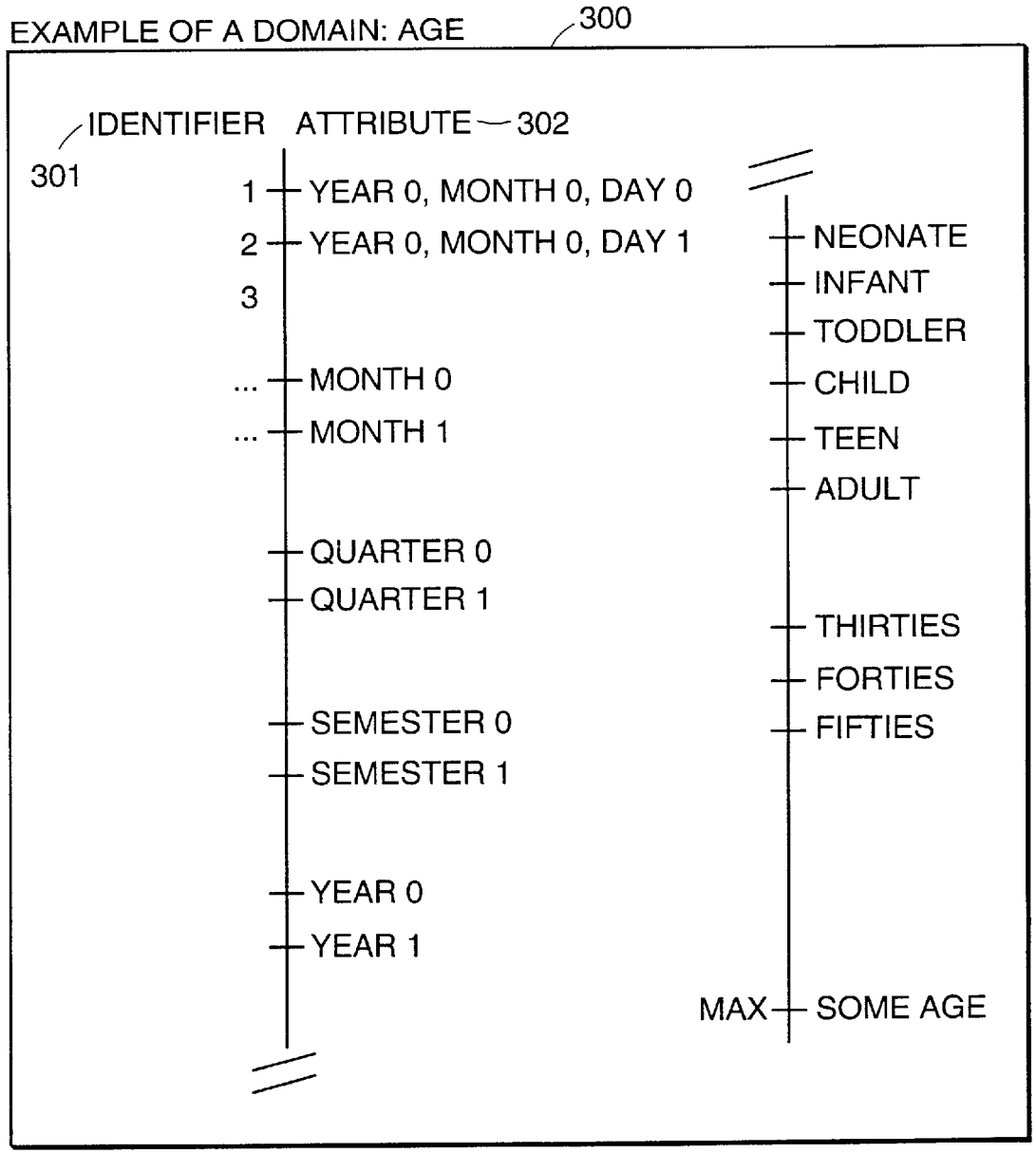
FIG. 3 shows an exemplification of domains.

FIG. 3 shows an exemplification of domains. It illustrates an example of a domain 300 with attributes relating to age. The example distinguishes between the attributes 302 and identifiers 301 for the attributes associated with the domain. The identifier may be an integer but the attributes may be of other data types. Other information available about the values on the domain and associated with the identifiers or attributes may include a description of the data type, e.g., number, string, integer, year ext., of attributes in the domain. Dimensions, e.g., the dimensions numbered by 201, inherit attributes, either directly or through references to domains or their identifiers. A dimension, here, refers to a structure that is set up in multidimensional analysis and may be nothing more than an instance of a domain, a subset of a domain or the domain itself. Measurements about a given domain may contain identifiers or other references to attributes on various levels, e.g., a specific age-in-days attribute, an age-in-years attribute or just a reference to the "Adult" attribute. Definitions of domains are stored in system 100 according to the present invention.

Level Sets

Figure 4:
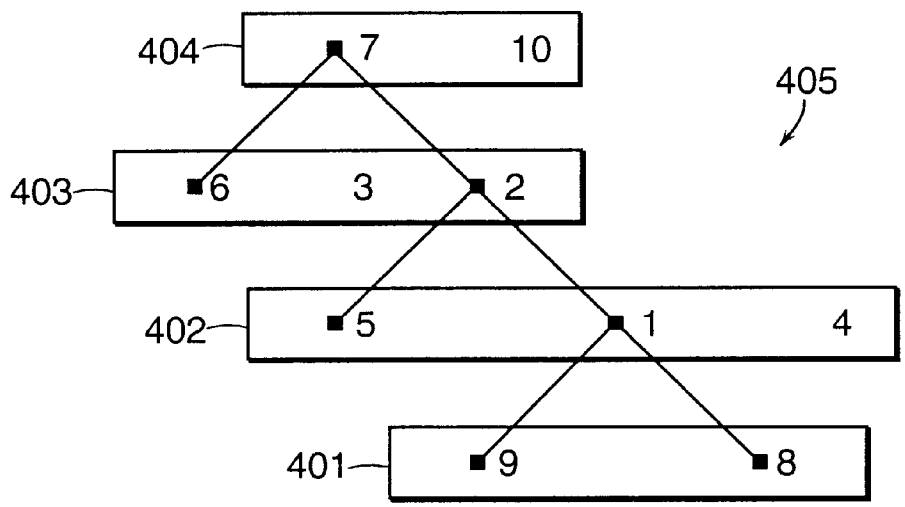
FIG. 4 shows an exemplification of hierarchies and their level sets.
Figure 4:
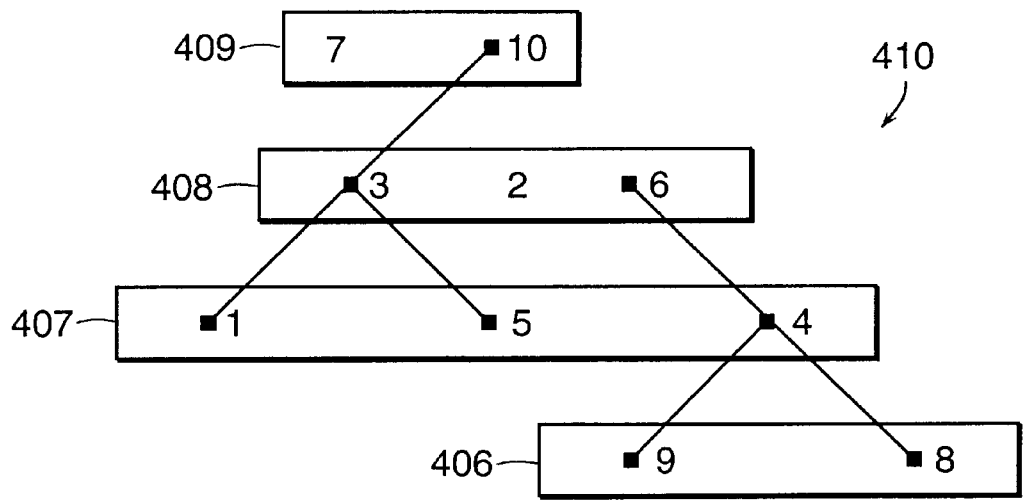

FIG. 4 shows an exemplification of hierarchies and their level sets (400). It shows two hierarchies 405 and 410 for the same domain. Hierarchies can be regarded as special binary relations on domains. Hierarchy 405 is the relation formed by the set of 2-vectors of identifiers (1,2), (2,7), (5,2), (6,7) (8,1) and (9,1). Similarly 410 is the relation defined by the tuples (1,3), (3,10), (4,6), (5,3), (8,4) and (9,4). The hierarchies define a hierarchical function on the domain, e.g., the hierarchical function for 405 maps 1 to 2, 2 to 7, 5 to 2, 6 to 7, 8 to 1 and 9 to 1. Other values in the domain may be mapped to some designated element (commonly denoted by the symbol NA), indicating that they are not represented on higher levels.

These structures may be predefined in the system, but hierarchies and level set structures may also by created and edited by a user of the system. The structures are stored in tables or files and form a part of the system 100. Level sets, corresponding to a hierarchy, as referred to in the current specifications, form a sequence of subsets of values from the domain such that the hierarchical function maps an element on a given level (set) to the subsequent level (set) if the element is an input for the hierarchical function. In other words a level set may contain elements that are from the domain but do not attach to the hierarchical structure, such as the element "10" from level set 404 as indicated on the drawing. The sets 401, 402, 403 and 404 form level sets for hierarchy 405 from lowest to highest level respectively. Similarly, the sets 406, 407, 408 and 409 form level sets, from lowest to highest for hierarchy 410. The two level set structures chosen are the same even though the hierarchies are different, i.e., the lowest levels 401 and 406 are the same, both contain just the identifiers 8 and 9, the next levels 402 and 407 are also the same and so on. The elements in level sets may be attributes, identifiers or other references to the values on the domain.

Depth-of-Field

Figure 5:
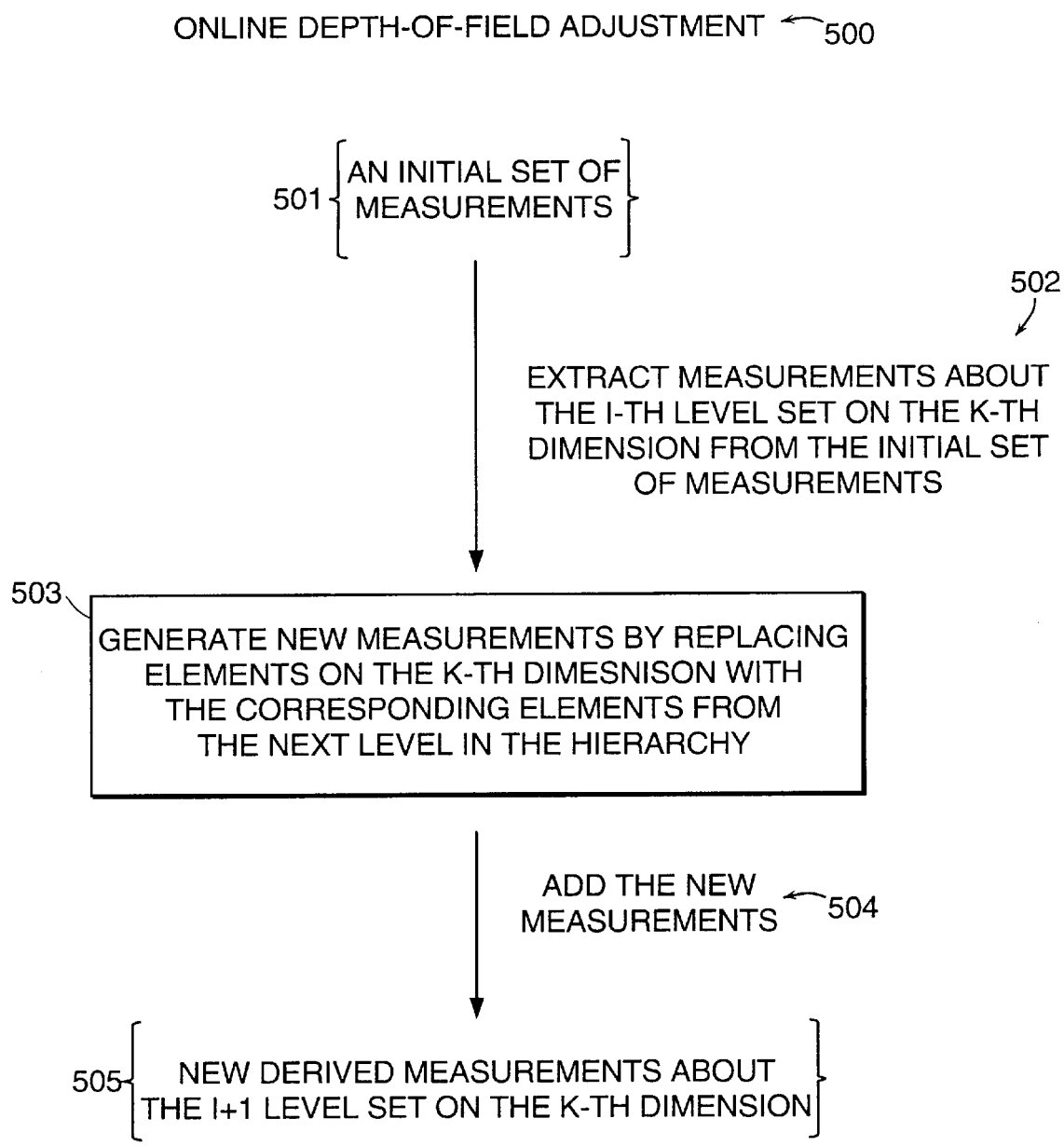
FIG. 5 is a block diagram describing an online depth-of-field operator for multidimensional analysis according to the present invention.

FIG. 5 is a block diagram describing an online depth-of-field operator for multidimensional analysis according to the present invention. It describes processes that adjust measurements (hence 500) in order to increase the number of possible points, i.e., composed measurements, in the multidimensional processing of a hypercube. The processes may be controlled by selected hierarchies or binary relations on selected dimensions. The operator can be applied to any dimension using any hierarchy on the dimension and between any levels of the hierarchy. It may be applied to several dimensions simultaneously. The process (500) may be initiated, repeated and controlled by a user, directly or indirectly, by selecting the required hierarchies, levels and so on. It may also be initiate by the system and controlled by additional metadata available about the measurements or hierarchies.

The block 501 represents a set of initial measurements. The measurements may be extracted from a database and be of various types, i.e., from the various relations stored in the system (100). The measurements may also be composed or derived such as measurements resulting from calculations or other processes that define relations. This may furthermore include measurements derived from previous applications of the processes denoted by 500, 600 or 700 and described herein. The set 501 may be located in memory or in other storage devices and it may furthermore be implicitly defined by including references to relations or subsets thereof. The starting point for the process is an initial set of measurements about dimensions selected for multidimensional processing in a hypercube. Which measurements are included in 501 may be determined by the system from the dimensions of the hypercube being populated with points. For example, by including relations that are supported by subsets of the dimensions. It can also be left to the user, performing the multidimensional analysis in the system, to select or define the relations included, or a combination of both.

The text 502 specifies that in order to perform the process (500) between selected level sets of a hierarchy on a given dimension the system (100) needs to locate the measurements specified in 501 that are about values on the first level set selected. For clarity (only) the dimension selected is numbered as the k-th dimension, see 502, included in the analysis. In addition, the lower and higher levels selected from a level set structure of the hierarchy are numbered by i and i+1, respectively, for clarity in the description.

Continuing the description of process 500, called depth-of-field adjustment here, block 503 specifies that new measurements are generated from the ones identified in 502 by replacing values from the first level set (i.e., the i-th one) selected, with values from the second level set selected (i.e., numbered by i+1) on the k-th dimension. This is done by replacing values on the first level, that map to the second level, with their corresponding images under the hierarchical function. Values from other dimensions in the measurements are not changed. The text block 504 indicates that the new measurements generated are added to the system, at least temporarily, e.g., in memory. The set of new measurements 505 may be combined with the previously defined ones in 501, i.e., modifying or creating new relations, or with a different set of measurements in order to allow new compositions, i.e., joins, to take place.

In order to make the processes 500 reversible a reference to the new measurements may be maintained, for example by numbering the new measurements and storing the reference numbers. The original and the new measurements are then used for further processing in the multidimensional analysis, e.g., to create new points to populate the hypercube with as described in connection with FIG. 2 and in connection with FIG. 7.

EXAMPLES

The depth-of-field operator/process described above may be used to vary the level of granularity of measurements. In many cases, measurements will be entered at such a fine granularity that they cannot be combined to form points without additional information, even when appropriate for the purpose of a particular analysis. An example of this could be a height measurement for someone that is 9234 days old and a weight measurement for the same person when she is 9190 days old. In order to combine a large quantity of such measurements the user of the system needs to be able to use a different criteria for comparison than "age in days", assuming that a large part of the measurements is entered at that level of granularity. This is done by applying the above process to the age dimension between level sets $L_0$ and $L_1$ with increasing granularity. Here, $L_1$ could contain age intervals such as "Adult" and $L_0$ contain age represented by a finer granularity such as "age in days"; the two levels being connected by the appropriate hierarchy.

The result of adjusting the depth-of-field between the levels, as described above, becomes clear when analyzing the projections of points onto the two dimensional height and weight plane for different levels. Restricting the age dimension to values in $L_0$ or $L_1$ before the depth-of-field adjustment would only reveal points where measurements can be joined based on their original granularity. This might be a small set of points. Restricting the age dimension to $L_1$ after the process might on the other hand reveal many more points, in the two dimensional projection, that where omitted before. The increased number of points displayed in the projection in the later case may reveal a connection between the two variables (height and weight) where as such a connection may very well not have been displayed using the original points only.

Another example involves measurements about individuals indicating location in terms of zip codes and measurements about water quality where location is entered in terms of larger regions. In order to be able to discover how pollution affects individuals, using multidimensional analysis, we equate location based on the region definition using the depth-of-field operator as before etc.

Blowup Operator

Figure 6:
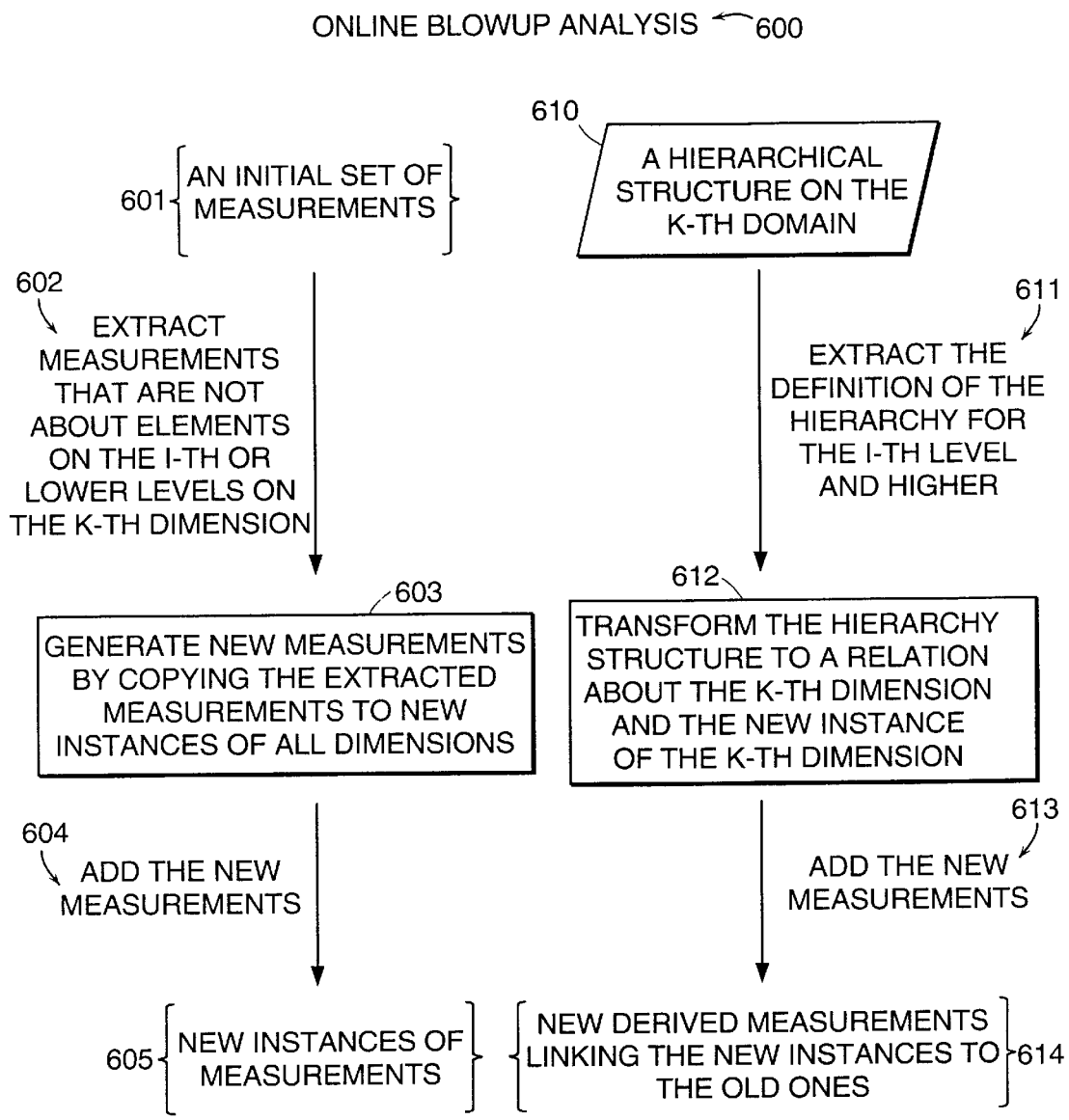
FIG. 6 is a block diagram describing an online blowup operator for multidimensional analysis according to the present invention.

FIG. 6 is a block diagram describing an online blowup operator for multidimensional analysis according to the present invention. The process (600) described is divided into two related sub-processes or operators. Both of the sub-processes are controlled by hierarchies and level sets of the hierarchies on a given dimension. The first sub-process starts with an initial set of measurements 601 and creates new instances, i.e., copies or equivalent, of some of the initial measurements with support on new instances of the original dimensions as described by blocks 602, 603, 604 and 605 and determined by the level sets and hierarchies involved. The second sub-process starts with a hierarchical structure 610 on the dimensions and converts the hierarchical structure into a relation as described by blocks 611, 612, 613 and 614. The relation generated by the second sub-process connects the original measurements to the new instances generated by the first sub-process. Both sub-processes may be repeated for several hierarchies with compatible level set structures for the same dimension and level as described below.

The blowup operator or process, as referred to here, may increase the number of dimensions in the multidimensional analysis proportionally to the number of hierarchies involved, also as described below. It can be applied to any level set of any dimension in the analysis. The starting point for the process is an initial set of measurements about dimensions selected for multidimensional processing in a hypercube.

The block 601 represents a set of initial measurements, similar to the initial set described by block 501 on FIG. 5. The process (600) may be initiated, repeated and controlled by a user, directly or indirectly, by selecting the required hierarchies, levels and so on similarly to what was described for process 500. The user of the system, performing the multidimensional analysis, selects a dimension and a particular level on some level set structure for the dimension and identifies one or more hierarchies sharing the level set structure. In many cases, there may be only one hierarchy for a given level set structure. Again, as in FIG. 5, we denote the dimension selected as the k-th dimension and the level selected as the i-th level in the level set structure, the subsequent level being identified as number i+1. This notation is for clarity only.

Text block 602 identifies which measurements are copied to new instances on new dimensions in 603. The measurements identified by 602 are measurements with values from the k-th dimension (i.e., the measurements are about the k-th dimension) where the values on the k-th dimension are on higher levels than the i-th level. This encompasses measurements about values on levels i+1, i+2 and so. Block 602 also identifies measurements that are not about the k-th dimension at all and therefore have no direct reference to it. In other words, all measurements not about level i or lower levels of the k-th dimension are identified as explained by the text 602.

Block 603 specifies that new instances of the original dimensions should be created and added to the pool of dimensions in the multidimensional analysis. Thus, possibly, doubling the number of dimensions in the hypercube structure. Finally, the measurements, identified by 602 above, are copied to new measurements with references, respectively, to these new dimensions instead of the original dimensions. For the cases when more than one hierarchical structure sharing the level set structure is selected, process 603 is repeated for each of the hierarchies selected. Thereby, possibly adding still another instances of each of the original dimensions and copying the measurements identified by 602 to those new instances also. Each time this is repeated the connection between the new and the original dimensions needs to be maintained, and to which of the selected hierarchical structures the new dimensions correspond. This bookkeeping can be accomplished, for example, by naming the new dimensions by appending the names of the original dimensions with the name of the relevant hierarchy and level. Text block 604 indicates that the new generated measurements are added to the relations used to populate the hypercube. The set of new measurements 605 may be stored with the previously defined ones in 601, adding new relations, for further multidimensional processing.

The second sub-process starts with 610 showing one of the hierarchical structures selected by the user as explained above. The sub-process is repeated for each hierarchy selected. Text block 611 indicates that information about the hierarchical structure on the i-th level and on higher levels needs to be made available. The next step, as indicated by block 612, is to transform the hierarchical information into measurements. This new relation connects the original instance of the k-th dimension to the new instance of the k-th dimension created according to 603 for the hierarchy 610. This is done by populating a binary relation over the dimensions, i.e., the original and the new instance of the k-th dimension. The relation generated by 612 contains measurements representing the graph of the hierarchical function for elements above and on the i-th level of the level set structure used in connection with the first sub-process above. In other words measurements where the first attribute, from the original k-dimension, is an element from the i-th and higher levels and the second attribute, from the new instance of the k-th dimension, is the corresponding image of the first element under the hierarchical function, if there is one. As before "NA" values, described above, are ignored.

Blocks 613 and 614 indicate that the resulting binary relation, just described, is added to the set of relations and as before needs to be available for further processing, e.g., generation of points in the larger hypercube. The operator is generic and can be applied to any dimension and hierarchy available for use in the hypercube.

EXAMPLES

Start with a ternary relation with domains representing individuals, age and height, i.e., height measurements, and hierarchies representing the genealogy of the individuals. The hierarchies are "Mother" and "Father" representing mothers and fathers of individuals in the domain. The hierarchies are such that they share the same level set structure $L_0$ and $L_1$. The lower level $L_0$ represents the latest generation of individuals, $L_1$ their parents and so on. The ternary relation being the initial set of measurements, 601, chosen for the analysis in an initial hypercube definition with the three dimension (individuals, age and height). Applying the blowup process along the Father hierarchy starting at level $L_0$ generates a 6 dimensional hypercube with axes including, for example, the original one Height, representing height of individuals, and also another instance of that dimensions, "Height-Father". The, now, six dimensional hypercube, after it has been populated with points resulting from the blowup process, may be projected onto the two dimensional plane determined by the Height and Height-Father dimensions. Doing so, for the different age groups, reveals to the person performing the multidimensional analysis the connection between these two attributes. The projection may be viewed as a two-dimensional scatter graph.

The Mother hierarchy may also be used simultaneously with the Father hierarchy, since they share the same level set, producing a 9 dimensional hypercube with more information embedded into it. Furthermore, the process can be repeated for higher levels or for projections only. This simple example shows some of the usefulness of the blowup operator. On the other hand the operator is designed to be able to work with much more complicated initial sets than just the one relation above and some of the relations don't necessarily have to be (directly) about the (k-th in the above) dimension selected.

Other examples include hierarchies that allow the user to compare attributes through development stages (such as by introducing levels on an age dimension representing neonate, infant, toddler, child, teen, adult ext.). Furthermore the blowup operator, like other operators and processes shown in the current invention, can be used to analyze relations applicable to many different industries, e.g., telecommunications, finance, retail and so on.

Ambiguity Resolution

Figure 7:
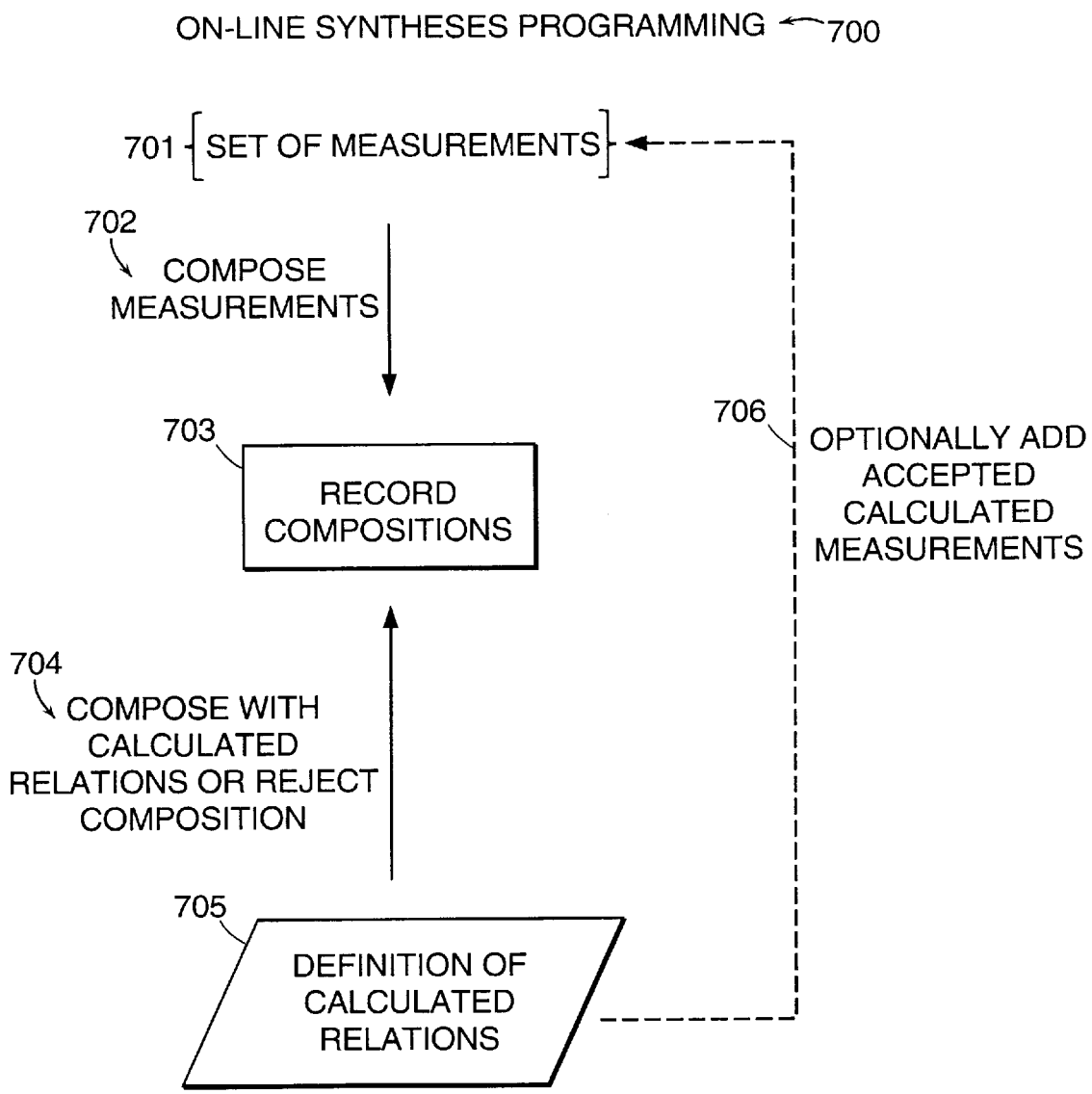
FIG. 7 is a block diagram describing an online syntheses programming technique for multidimensional analysis according to the present invention.

FIG. 7 is a block diagram describing an online syntheses programming technique for multidimensional analysis according to the present invention. In order to enable dimensions to have a "universal" meaning their implicit relation with each other has to be described. This can be achieved to a large degree by enforcing relations describing formulas and other predicable (i.e., not necessarily measured in a real life setting) structures connecting the dimensions in a hypercube. Process 700 (Online syntheses programming) describes a technique for modifying the join process (e.g. see FIG. 2) in multidimensional processing to dynamically account for internal connections between dimensions. Thereby, reducing the number of possible points in the hypercube that is being populated, by only allowing points that belong to subspaces defined by the internal connections.

Process 700 starts with a set of measurements 701 used to populate a given hypercube structure with points using a join process similar to the join process described in connection with FIG. 2. It also has access to a set of calculated relations 705 in the form of functions accepting as input attributes from some of the dimensions in the hypercube. The functions return other attributes on dimensions in the cube or Boolean values. These calculated relations may for example be obtained by selecting from a, previously defined, set of such calculated relations all relations that can be expressed using the dimensions in the hypercube. It may also just contain a subset thereof determined by a hierarchical structure about the calculated relations containing information about which calculated relation cannot be used together. In the cases when a conflict occurs the system opts for the relation referred to on a higher level in the hierarchy. Other possible schemas for determining which relations need to be included in 705 may include input from the user of the system. The functions return new attributes about other dimensions in the hypercube, the combined input and output forms a set of related values. Among the calculated relations may also be Boolean expressions that reject or accept a set of input attributes from the dimensions of the hypercube.

The relations in 701 may for example be obtained by applying (repeatedly) processes 500 and 600, resulting in measurements such as 501 and 505 or 601, 605 and 614 or a combination of both. The relations in 701 may require being grouped together into larger relations according to supporting dimensions, if more than one relation in 701 is supported by the same collection of dimensions in the hypercube. Herein, a collection of dimensions supporting a relation is said to determine the type of the relation, i.e., relations supported by a different set of dimensions are of different type. The preprocessing of relations in 701 involves concatenating relations of the same type into larger relation directly or indirectly. For example, by linking all the relations of the same type in 701, into a new (virtual) relation.

Text blocks 702 and 704 indicate that the measurements are joined into possibly longer composed measurements and eventually into points in the hypercube. The join process may use different join criteria and join operators for each dimension in the hypercube as described in connection with FIG. 2. Block 702 indicates that measurements from 701 are composed, according to the join criteria selected for their supporting dimensions and using their associated join operators, until they describe input attributes for at least one of the functions in 705. The input attributes are then used, as indicated by 704, to generate new calculated measurements with related values from the input attributes and output attributes of the functions accepting the input values. In the case of a Boolean expression accepting the input attributes, it, i.e., the output of the function, is used to decide if the composed measurement should be rejected or not. The new calculated measurement can then simply be added to the measurements in 701 (as indicated by text block 706) or composed, using the join operators, immediately with the original (composed) measurement containing the input attributes. If the join fails, i.e., the measurements don't satisfy the join criteria selected (e.g., attributes don't match), then the original measurement is rejected.

Bookkeeping of allowed compositions needs to be maintained, as indicated by block 703 since allowed composed measurements with defined attributes, determined by the join operators, about all the dimensions in the hypercube define the points in the hypercube. The system may be required to consider all the preprocessed relations in 701 and all calculated relations in 705 also, i.e., the longest path. This may be achieved by sequentially numbering the preprocessed relations (e.g., the numbering in 202) and not skipping using any of the preprocessed relations in the join process even when fewer of the relations already define the required attributes (e.g., measurements 204, 205 and 206). When using the default (natural) join criterion and operator, this will require the points generated to be such that if they are projected to dimensions already used to support a relation (i.e., of a specific type) in 701 then that projection will already exist in the corresponding preprocessed relation for the type. Herein, we will refer to taking the longest path when generating the points in the hypercube, as mentioned above, as implying that the points in the hypercube being contradiction free—with respect to existing relation types in 701.

EXAMPLES

Given a user defined eight-dimensional hypercube with the (self-explanatory) dimensions: Individual, Time, Birthday, Age-Diagnosis, Age-Location, Diagnosis, Location and Pollution. Set the relations in 701 to be Birthday, Diagnosis, Whereabouts and Pollution. Extracting individual measurements from each of the relations, respectively, might reveal measurements such as $M_1$=(id, birthday), $M_2$=(id, age.diagnosed, lung-cancer), $M_3$=(id, age.location, location) and $M_4$=(location, time, air-quality). Here id, time, birthday, age.diagnosed, age.location, lung-cancer, location and air-quality respectively represent fixed attributes from the dimensions in the hypercube. The measurements $M_1$, $M_2$, $M_3$ and $M_4$ can be joined, per se, using the natural join to form a point in the hypercube with the eight attributes shown. On the other hand, this may not be meaningful at all, unless a calculated relation is present enforcing the implicit connections between the dimensions Birthday, Time and the two Age dimensions. Therefore, if available to the system, it would automatically add the calculated relations $C_1$ and $C_2$ to 705 representing the connections, e.g., birthday+age.diagnosed=time and birthday+age.location=time respectively, in one form or another. With those new relations $C_1$ and $C_2$ in 705 the point, i.e., (id, time, birthday, age.diagnosed, age.location, lung-cancer, location, air-quality), with the attributes shown will not be formed in the eight dimensional hypercube unless it satisfies $C_1$ and $C_2$ also.

On the other hand, even though these four dimensions appear to be related for most studies many other relations are possible than the one presented above. Depending on the other dimensions in the hypercube. In order for the system to choose from the other possible calculated relations, a predefined hierarchical structure among the calculated relations is used, as shown below. Assuming now that the user performing the multidimensional analysis additionally has placed an "offset" dimension, called Offset, in the hypercube. The dimension represents offset in age. Assuming also then, that 701 contains a unary relation with integer attributes from the Offset dimension, say 0 to 20, representing years. This, depending on availability of calculated relations, results in the system having to evaluate which of the relations $C_1$ or $C_2$ above or, another calculated relation, $C_3$ to use. The calculated relation C3 representing the formula age.diagnosed=age.location+offset in one form or another. A "reasonably" defined hierarchical structure among the calculated relations would opt for using $C_2$ and $C_3$ in 705.

Score Tables

Figure 8:
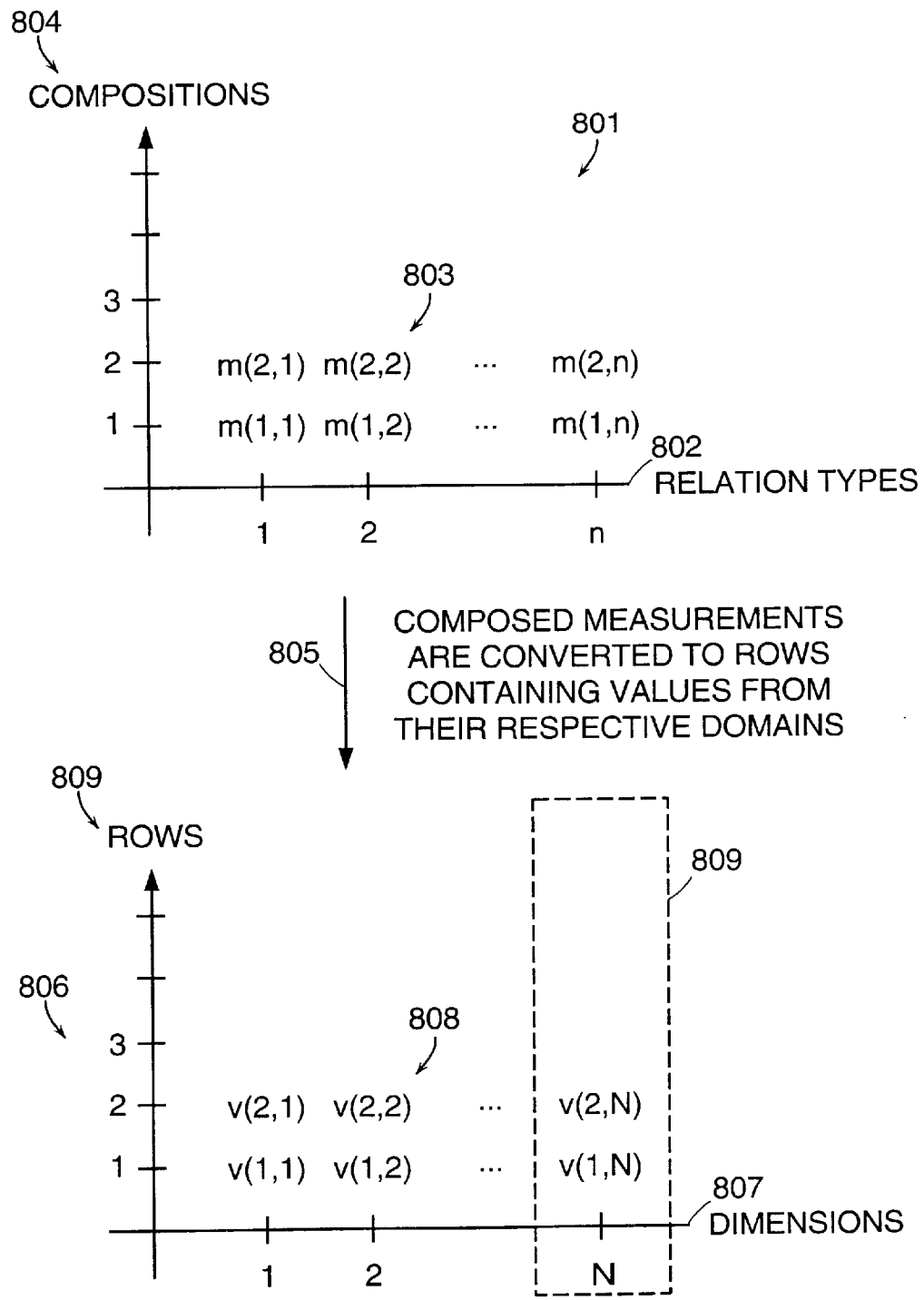
FIG. 8 is an illustration of processes used to record composed measurements.

FIG. 8 is an illustration of processes used to record composed measurements. The table 801 contains information recorded in process 700 and describes how the composed measurements may be recorded by 703. The table has one column for each preprocessed relation, i.e., relation type, in 701 shown here numbered from 1 to n (802). Each completed row in the table corresponds to one point in the hypercube used in the multidimensional analysis. The rows are numbered sequentially as indicated by 804. The entries 803 in the table are references to corresponding measurements in 701 and may, for example, contain a reference number or simply refer to memory locations for the measurements. The table 801 allows the system to track more than just dimension attributes, such as done by table 806, namely it refers directly to the measurements in the system. Consequently removing a measurement from any of the relations in 701 can be done, online, without starting the analysis process again. This is achieved by simply removing only the points (rows) in 801 that refer to the measurement that is being removed. Adding a new measurement to any of the relations in 701 simply results in zero or more additional rows in 801 and can be done online by completing the additional rows with references to other compatible measurements in 701 starting with the one that is being added. The entry m(i,j) from 803 refers to, as explained above, a measurement from the preprocessed relation numbered by j in 701 and where i is the corresponding row number. Each row in 801 contains measurements that can be composed to form a point according to the join criteria for the dimensions. The table 801 contains all such rows resulting from the set of measurements being used (701).

Table 801 may be populated in a recursive fashion starting from the first entry, e.g., m(1,1). The rows are extended by adding measurements compatible (using the join criteria) with the existing ones already in the row. If no compatible measurement for a particular column and row in the table is found then the system replaces the measurement in the previous column with the next available measurement before trying again and so on. This continues until all possible points have been generated. The system may be made contradiction free, as defined above, by only including fully completed rows, i.e. no "nulls".

Text block 805 indicates that table 801 may be used to populate the fact table 806 containing one column for each dimension, numbered by 1 to N as indicated by 807. When the default (natural) join criterion and operator is used for all the dimensions in the hypercube the rows in 801 are simply converted to a sequence of values by looking up the related values determined by the measurements in the rows. These values are then stored, respectively according to dimension, in the next available row in table 806. At the same time, repeated rows in 806 may be avoided. For a dimension using different join operators, e.g., summation, the operator is applied to the values from the dimension extracted from the measurements before being stored in the fact table as before.

The values (shown as 808) may be attributes or identifiers depending on the dimension tables used in connection with the fact table. In order for table 806 to be considered a valid fact table the user of the system needs to select one attribute column as the "fact" item, as indicated by 809. This may also be accomplished by the system itself, choosing the "fact" attribute from a list of default such dimensions. Such a list would normally consist of dimensions containing numeric attributes.

Grouping and Dimensions Tables

Figure 9:
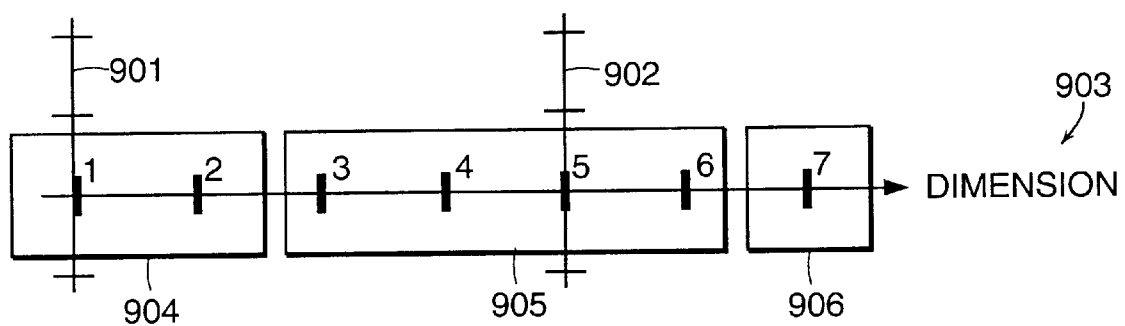
FIG. 9 is a high level illustration of a grouping technique that allows measurements to be supported on different and varying levels according to the present invention.

FIG. 9 is a high level illustration of a grouping technique that allows measurements to be supported on different and varying levels according to the present invention. FIG. 9 illustrates a generic dimension 903 in a hypercube. Associated with the dimension is a level set structure for a hierarchy designated for grouping of values by the user of the system. The different level sets are indicated by 904, 905 and 906. Two different measurements 901 and 902 are shown each taking one of their values from the dimension. The values are shown on different level sets. Grouping values, according to hierarchical structures, in a hypercube, without forcing measurements to be entered on compatible level sets (e.g., lowest) may be enabled as follows: For a fixed point, identified for grouping, in the hypercube the system identifies which points are on lower, or same, levels and are carried by the hierarchical functions to the fixed point identified. Different hierarchical functions may be applied to attributes from different dimensions, as determined by the hierarchical structures set up for each dimension in the cube. Furthermore, the hierarchical functions may be applied iteratively or not at all to the different attributes as determined by the number of level sets between a given attribute and the corresponding attribute from the fixed point selected.

The information about the grouping may be stored separately as a sequence of numbers listing the rows in table 801 that are identified in the process. A reference needs to be maintained between the list and the grouping point, for example by numbering all such points and connecting the lists and the numbers etc. Using the information the system may then display calculations associated with the points using one or more of the attributes of the measurements identified in the lists. The calculations may be initiated by the user specifying aggregation operators, as explained in connection with FIG. 11.

An example includes counting the number of different attributes on a specific dimension. Another example may include using more complicate operations applied to the attributes requiring information stored elsewhere in system 100, such as kinship measures requiring addition genealogical information.

The link that is maintained with the measurements in 801 also enables any aggregation operator to access other information (e.g., cost) not necessarily stored in the hypercube model but linked to the individual measurements in 801. Grouping may be implemented for a set of points by identifying which level sets on each dimension should be considered aggregation or grouping levels and then repeating the grouping process above for points in the hypercube with attributes from these levels. Grouping can be made more efficient in this case by, for example, storing additional information about the rows in 801 such that points (rows) with attributes on the same level set on each of the dimensions are quickly located.

FIG. 10 is an illustration of a process used to convert hierarchies to dimension tables according to the present invention. Dimension tables are used, in the prior art, in connection with fact tables, e.g., 806. They store identifiers connecting the columns in fact tables, excluding the fact column (e.g. 809), to attributes and describe the grouping of the fact table according to attributes on higher levels. In a ROLAP system using a star or snowflake schema a column in a fact table may be connected to a dimension table through an entity relationship. This requires that the values in the fact table be entered at the lowest level in the grouping hierarchy. This grouping is more restricted than the one described above since it does not allow measurements to be entered using values from higher level sets. In order to enable grouping of table 806 through a standard star or snowflake schema the system may modify the grouping hierarchies, e.g., selected by the user, for the dimensions in the hypercube.

The hierarchies are modified as explained by text box 1002 and as shown by the example of a hierarchical function 1003 and its modified version 1001. The modified hierarchical function 1001 is such that elements on higher levels are grouping elements and are always images of elements from lower levels in the hierarchy. Such a regular hierarchy is translated into dimension table(s) in a star or snowflake schema in a way that is well established in the prior art. The modification of the hierarchical functions, e.g., the process 1002, may be performed as follows: Starting from the highest level of the hierarchy the system identifies all elements on that level. For these elements (e.g., 7 in 1003) the system adds new instances of the elements identified, represented with new elements (e.g. 7' in 1001) on the previous lower level and connects the new element to the original one by mapping the new element to the old (e.g., 7' maps to 7). The attribute corresponding to the new identifier (e.g., 7') is kept the same as the attribute for the old identifier on the higher level (e.g., 7). This process then continues for the second highest level, adding elements to the third highest level, and so on until the last level has been populated with new additional elements representing elements starting at higher levels. In other words, elements on higher levels are extended to the lowest level.

When converting the new modified hierarchical function to a dimension table, the system may use the same identifiers (e.g. 7 for 7' and 7" in 1001) and attributes for all the corresponding new elements introduced on lower levels to represent the same higher-level element. Thereby, the elements in the (non-fact) columns in fact table 806 only refer to lowest level elements in the dimension tables generated, as required. The person skilled in the art will realize, from the above description, that the intermediate step of creating the modified hierarchy (e.g. 1001) can be regarded also as a description of how to create the dimension tables directly, without introducing additional hierarchical structures into the system, such as 1001.

The exemplary hierarchical function 1003 is shown as a relation with two columns where the elements from the first column map to corresponding elements shown in the second column. The lowest level set for the hierarchy may be determined from the function and in the case of 1003 consists of the elements 1 and 2, the next level set consists of the elements 3,4,5 and 6 and the highest level set contains 7 only. The modification of the hierarchy described above and illustrated by 1002 results in the function 1001 with lowest level set consisting of lowest level 1, 2, 3', 4', 5', 6' and 7" the next level contains 3, 4, 5, 6 and 7' and the highest level contains 7 only. The process described by 1002 may be further enhanced by only extending elements from higher levels to the lowest level, as described above, for elements that actually appear as keys in table 806.

Fact Dimension and Fact Tables

Figure 11:
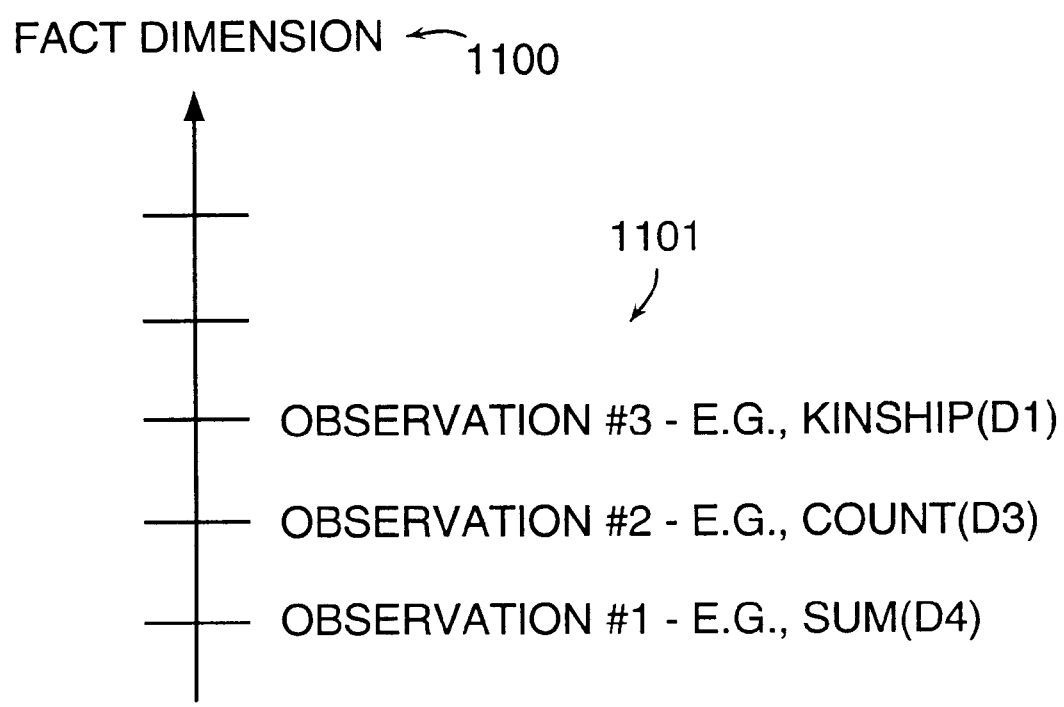
FIG. 11 shows an exemplification of a fact dimension according to the present invention.

FIG. 11 shows an exemplification of a fact dimension according to the present invention. The table 806, representing points in the hypercube, is converted into a fact table by having one column (809) identified as a "fact" attribute as explained above. This, on the other hand, may not be the desired "fact" that the user performing the multidimensional analysis is interested in working with. In working with measurements the desired quantifying fact may not even be well defined, or meaningful, at atom or row level in table 806. Furthermore, it may be most useful to have more than one fact displayed in the fact table. This may be achieved as described below.

Instead of identifying one row, i.e., 809, containing the fact item, two more columns may be added to table 806. One of the columns (e.g., the last column) is the new fact column and the other column would contain identifiers from a new separate dimension, called here the fact dimension. The fact dimension, e.g., 1101, has attributes referring to measures or observations (1101). The observations are stored in system 100 as functions that accept as input references, either direct or with the aid of additional structures such as the dimension tables or otherwise, to a set of attributes in 806 identified by the grouping process. Additional parameters may be passed to the observations also. The observations return a value that is then recorded in the corresponding fact column. Generating dimension tables for the fact dimension is straightforward, it does not need to have any additional levels, just the lowest level with the measure names as attributes.

The modified fact table, i.e., 806 with the two additional columns described above, may then be populated using the corresponding observation functions described above. More precisely, for each row in 806 the extended fact table contains rows with the same attributes as in 806, but appended with a reference to the fact dimension in one of the two new columns. The value of applying the corresponding observation to the (attributes in the) row in 806 in then recorded in the other additional column, called fact column above. A similar process may also be used to produce fully or partly aggregated summary tables, using the measures referred to by the fact dimension.

Automata and Axes Matrices

Figure 12:
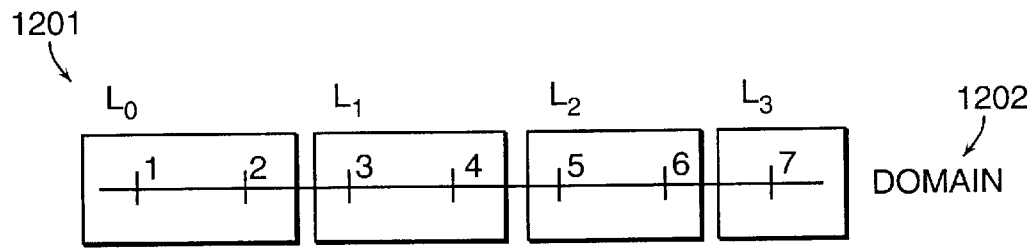
FIG. 12 is an illustration of the definitions needed to generate a hypercube from measurements according to the present invention.
Figure 12:
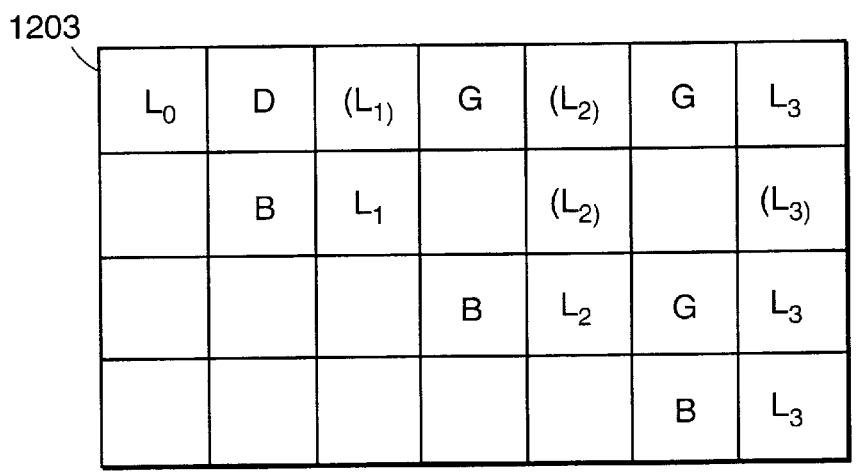

FIG. 12 is an illustration of the definitions needed to generate a hypercube from measurements according to the present invention. The methods described above allow the system directed by a user performing the multidimensional analysis to generate and populate a hypercube using methods such as 500, 600 and 700. The system may eventually be directed to convert the structures into fact table schemas as explained in connection with FIGS. 8, 9, 10 and 11. In order to automate the processes further additional information may be stored, i.e., metadata, such as the information stored in the structure 1203, called axes matrix here. These additional structures may be used to automatically direct the system to repeatedly apply operators such as 500, 600 and the process 700 and eventually generate fact (e.g., 806) and dimension tables for an initial set of relations, as described already.

The illustration shown on FIG. 12 is achieved by exemplifying the concepts. Domain 1202 is shown containing identifiers grouped according to level sets (1201) for one or more selected hierarchies for the domain. Associated to the domain are one or more predefined structures, such as the axes matrix 1203, that specify how measurements about the domain may be processed in multidimensional analysis, and which hierarchies and level sets to use. The exemplary structure 1203 is a matrix containing four rows each representing one dimension instance of the domain 1202. Columns 1, 3, 5 and 7 contain references to the four level sets that the domain has. The first row, starting in the upper left corner, identifies the first instance of domain 1201 as a dimension in the hypercube. Entries in the row specify which level sets should not be used for aggregation, i.e., $L_1$ and $L_2$. It is also specified how operator 500 (depth-of-field) should be applied, i.e., between levels $L_0$ and $L_1$. It is also shown what elements are included from the domain, i.e., all the four level sets are shown to be included. Furthermore it is specified where grouping of values takes place, i.e., starting from level $L_1$.

The second line specifies the second instance of the domain as a dimension in the hypercube, this time it does not include values from the lowest level. The beginning of the line indicates that the second instance is obtained from the first by process 600 (blowup) and so on. Similarly, the third line shows how the third instance of the domain is obtained from the second by a blowup process as before.

Axes matrices may be selected from a predefined set of such structures, or defined, by the user performing the multidimensional analysis. The user may select different axes matrices for the various domains holding values from measurements in the initial set of relations. Thereby, implicitly defining complicated axes structures in a hypercube together with simultaneously determining other processing of measurements used to populate the hypercube. These and the methods described above allow the user to populate a data warehouse with a minimal effort.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for adjusting relations in multidimensional processing, comprising:

(a) determining relations for processing, each relation having a respective domain;

(b) associating the domains of said relations with dimensions in a hypercube representation, (c) associating a hierarchical structure with at least one of the dimensions in said hypercube, (d) designating a hierarchical structure and a level of said hierarchical structure associated with a dimension in said hypercube, and (e) modifying said relations by generating measurements in the hypercube derived from measurements in said relations by equating values on said level of said dimension according to their corresponding hierarchical value on the succeeding level, thereby implementing a depth-of-field operator for said hypercube representation.

2. The method of claim 1, comprising:

(a) repeatedly applying said dept-of-field operator and/or other operators that otherwise modify and/or add relations for processing in the hypercube and/or modify the dimension structure in the hypercube, (b) determining join criteria and join operators for the dimensions in the modified hypercube, (c) determining calculated relations for the modified hypercube, and (d) composing related values from said modified relations and said generated measurements into points in said modified hypercube using said join criteria, said join operators and said calculated relations.

3. The method of claim 1, comprising:
   (a) designating said hierarchical structure and level by associating a metadata/macro description with said dimension, and where said metadata/macro description initiates and controls a sequence of operations including, repeatedly applying said dept-of-field operator and/or other operators that otherwise modify and/or add relations for processing in the hypercube and/or modify the dimension structure in the hypercube,
   (b) determining join criteria and join operators for the dimensions in the modified hypercube,
   (c) determining calculated relations for the modified hypercube, and
   (d) composing related values from said modified relations and said generated measurements into points in said modified hypercube using said join criteria, said join operators and said calculated relations.

4. The method of claim 1, wherein said relations contain, inter alia, heterogeneous information including disease/health data about individuals, genotype readings and/or readings about environmental factors and/or said hierarchical structures contain information about genealogical records or classification of attributes used in association with health related records about individuals.

5. A system for adjusting relations in multidimensional processing, the system comprising:
   (a) means for determining relations for processing,
   (b) means for associating the domains of said relations with dimensions in a hypercube representation,
   (c) means for associating a hierarchical structure with at least one of the dimensions in said hypercube,
   (d) means for designating a hierarchical structure and a level of said hierarchical structure associated with a dimension in said hypercube, and
   (e) means for modifying said relations by generating measurements in the hypercube derived from measurements in said relations by equating values on said level of said dimension according to their corresponding hierarchical value on the succeeding level,
   thereby implementing a dept-of-field operator in a system for processing multidimensional hypercube representations.

6. The system of claim 5, further including:
   (a) means for repeatedly applying said dept-of-field operator and/or other operators that otherwise modify and/or add relations for processing in the hypercube and/or modify the dimension structure in the hypercube,
   (b) means for determining join criteria and join operators for the dimensions in the modified hypercube,
   (c) means for determining calculated relations for the modified hypercube, and
   (d) means for composing related values from said modified relations and said generated measurements into points in said modified hypercube using said join criteria, said join operators and said calculated relations.

7. The system of claim 5, further including:
   (a) means for designating said hierarchical structure and level by associating a metadata/macro description with said dimension, and where said metadata/macro description initiates and controls a sequence of operations including, repeatedly applying said dept-of-field operator and/or other operators that otherwise modify and/or add relations for processing in the hypercube and/or modify the dimension structure in the hypercube,
   (b) means for determining join criteria and join operators for the dimensions in the modified hypercube,
   (c) means for determining calculated relations for the modified hypercube, and
   (d) means for composing related values from said modified relations and said generated measurements into points in said modified hypercube using said join criteria, said join operators and said calculated relations.

8. The system of claim 5, further including means for having said relations contain, inter alia, heterogeneous information including disease/health data about individuals, genotype readings and/or readings about environmental factors and/or said hierarchical structures contain information about genealogical records or classification of attributes used in association with health related records about individuals.

* * * * *